United States Patent
Vander Sluis et al.

(10) Patent No.: US 10,406,991 B2
(45) Date of Patent: Sep. 10, 2019

(54) MOBILE-DEVICE RETAINING ASSEMBLY FOR USE WITH A VEHICLE

(71) Applicant: FAURECIA INTERIOR SYSTEMS, INC., Auburn Hills, MI (US)

(72) Inventors: Daniel Vander Sluis, Rochester Hills, MI (US); Stephen Jones, Commerce Township, MI (US)

(73) Assignee: FAURECIA INTERIOR SYSTEMS, INC., Auburn Hills, MI (US)

( * ) Notice: Subject to any disclaimer, the term of this patent is extended or adjusted under 35 U.S.C. 154(b) by 0 days.

(21) Appl. No.: 15/395,070

(22) Filed: Dec. 30, 2016

(65) Prior Publication Data

US 2018/0186303 A1    Jul. 5, 2018

(51) Int. Cl.

| B60R 11/00 | (2006.01) |
|---|---|
| B60R 11/02 | (2006.01) |
| F16H 21/44 | (2006.01) |
| H02J 7/02 | (2016.01) |
| H02J 7/00 | (2006.01) |
| H02J 50/10 | (2016.01) |

(52) U.S. Cl.
CPC .......... *B60R 11/0241* (2013.01); *F16H 21/44* (2013.01); *H02J 7/0044* (2013.01); *H02J 7/025* (2013.01); *H02J 50/10* (2016.02); *B60R 2011/0075* (2013.01); *B60Y 2304/05* (2013.01)

(58) Field of Classification Search
CPC ................. B60R 11/0241; B60R 16/03; B60R 2011/0075; F16H 21/44; H02J 7/025; H02J 7/14; B60Y 2304/05

USPC ......................................................... 224/544
See application file for complete search history.

(56) References Cited

U.S. PATENT DOCUMENTS

| 7,900,988 B2* | 3/2011 | Ryu .................... B60R 11/0235 224/483 |
|---|---|---|
| 8,807,621 B2* | 8/2014 | Stephan .................... B60R 7/06 296/37.12 |
| 2006/0278788 A1* | 12/2006 | Fan ......................... B60R 11/02 248/309.1 |
| 2008/0174136 A1* | 7/2008 | Welschholz .............. B60R 7/06 296/37.12 |
| 2012/0104195 A1* | 5/2012 | Da Costa Pito .... B60R 11/0241 248/205.1 |
| 2013/0008930 A1* | 1/2013 | Hipshier ................... B60R 7/04 224/275 |

(Continued)

*Primary Examiner* — Peter N Helvey
(74) *Attorney, Agent, or Firm* — LKGlobal | Lorenz & Kopf, LLP

(57) ABSTRACT

A mobile-device retaining assembly includes a housing for mounting within an opening in an internal surface of a vehicle, a bed associated with the housing and configured to receive the mobile-device and to support the mobile device in an orientation that is generally aligned with the internal surface, and a first armature engaged with the bed and configured to engage the mobile device. The bed moves between a receiving position and a retaining position. The first armature remains stationary as the bed moves through a first stage of movement between the receiving position and the retaining position and then moves between a first disengaged position and a first engagement position when the bed moves through a second stage of movement between the receiving position and the retaining position. The first armature is configured to secure the mobile-device when the first armature is in the first engagement position.

13 Claims, 13 Drawing Sheets

(56) References Cited

U.S. PATENT DOCUMENTS

| | | | |
|---|---|---|---|
| 2013/0093205 A1* | 4/2013 | Stephan | B60R 7/06 296/37.12 |
| 2014/0339847 A1 | 11/2014 | Brunard et al. | |
| 2015/0291073 A1* | 10/2015 | Pajic | A47B 23/00 320/108 |

* cited by examiner

MOBILE-DEVICE RETAINING ASSEMBLY FOR USE WITH A VEHICLE

TECHNICAL FIELD

The technical field generally relates to automobile interiors and more particularly relates to mobile-device retaining assemblies for use with a vehicle.

BACKGROUND

The use of mobile-devices such as smart phones, tablets, phablets, and the like, has become common place. Mobile-devices provide users with a wide variety of information, notifications, and communications, all of which is available at a glance by viewing the mobile-device's display screen.

When operating a vehicle, a user frequently choses to remove the mobile-device from his or her pocket or purse and places the mobile device in a cup holder or in some other easily accessible compartment in the vehicle. This allows the user to readily access the mobile-device in the event that the user receives a phone call or needs to review information presented on the display screen of the mobile-device.

When situated in a cup holder or other interior compartment, the mobile-device is untethered and free to move in response to the forces arising from vehicle motion. An unsecured mobile-device may become dislodged from the cup holder or other compartment and may fall into the vehicle foot well or other areas of the interior of the passenger compartment. This is undesirable because it may render the mobile device inaccessible and in some instances, it may damage the mobile-device or possibly cause unintended driver distraction while the user attempts to retrieve the dislodged device.

An earlier attempt to resolve this problem was disclosed in U.S. Publication no. 2014/0339847, submitted by Brunard, et al. (hereinafter, "Brunard"). Brunard describes a holder device in a motor vehicle for a portable electronic apparatus. The device includes a stationary frame secured to a structural element of the vehicle and a drawer connected to the frame. The connection of the drawer to the frame is arranged such that the drawer is movable relative to the frame between a storage position and a usage position. As illustrated in Brunard, the mobile device is secured in an orientation that is orthogonal to the surface in which the frame/drawer is mounted.

This solution gives rise to a significant problem. By orienting the frame, the drawer, and the mobile-device orthogonally to the surface in which it is mounted, the frame and drawer must penetrate deeply into the class B-surface of the interior (the surfaces that are not visible to a vehicle occupant). This arrangement requires a substantial amount of free space beneath the class A-surface (the surface that is visible to a vehicle occupant) to accommodate the frame and drawer and thus may interfere with the placement of other vehicle components and may limit the locations within the interior where Brunard's holder device can be mounted. Additionally, when the drawer is in an extended position, it protrudes substantially into the vehicle interior, potentially obstructing the user's ability to access other components, compartments, or areas within the interior of the vehicle.

Accordingly, it is desirable to provide a mobile-device retaining assembly that minimally intrudes into the class B surface and that causes no significant obstruction within the passenger compartment. Furthermore, other desirable features and characteristics will become apparent from the subsequent detailed description and the appended claims, taken in conjunction with the accompanying drawings and the foregoing technical field and background.

SUMMARY

Various embodiments of a mobile-device retaining assembly for use with a vehicle are disclosed herein.

In a first non-limiting embodiment, the assembly includes, but is not limited to, a housing that is configured for mounting in an opening in an internal surface of a passenger compartment of the vehicle. The assembly further includes, but is not limited to, a bed that is associated with the housing. The bed is configured to receive the mobile-device and to support the mobile-device in an orientation that is generally aligned with the internal surface. The assembly further includes, but is not limited to, a first armature that is engaged with the bed and that is configured to engage the mobile device. The bed is configured to move with respect to the housing between a receiving position and a retaining position. The first armature is configured to remain stationary with respect to the housing as the bed moves through a first stage of movement between the receiving position and the retaining position. The first armature is configured to move with respect to the housing between a first disengaged position and a first engagement position when the bed moves through a second stage of movement between the receiving position and the retaining position. The first armature is further configured to secure the mobile-device when the first armature is in the first engagement position.

DESCRIPTION OF THE DRAWINGS

One or more embodiments will hereinafter be described in conjunction with the following drawing figures, wherein like numerals denote like elements.

DETAILED DESCRIPTION

Figure 1:
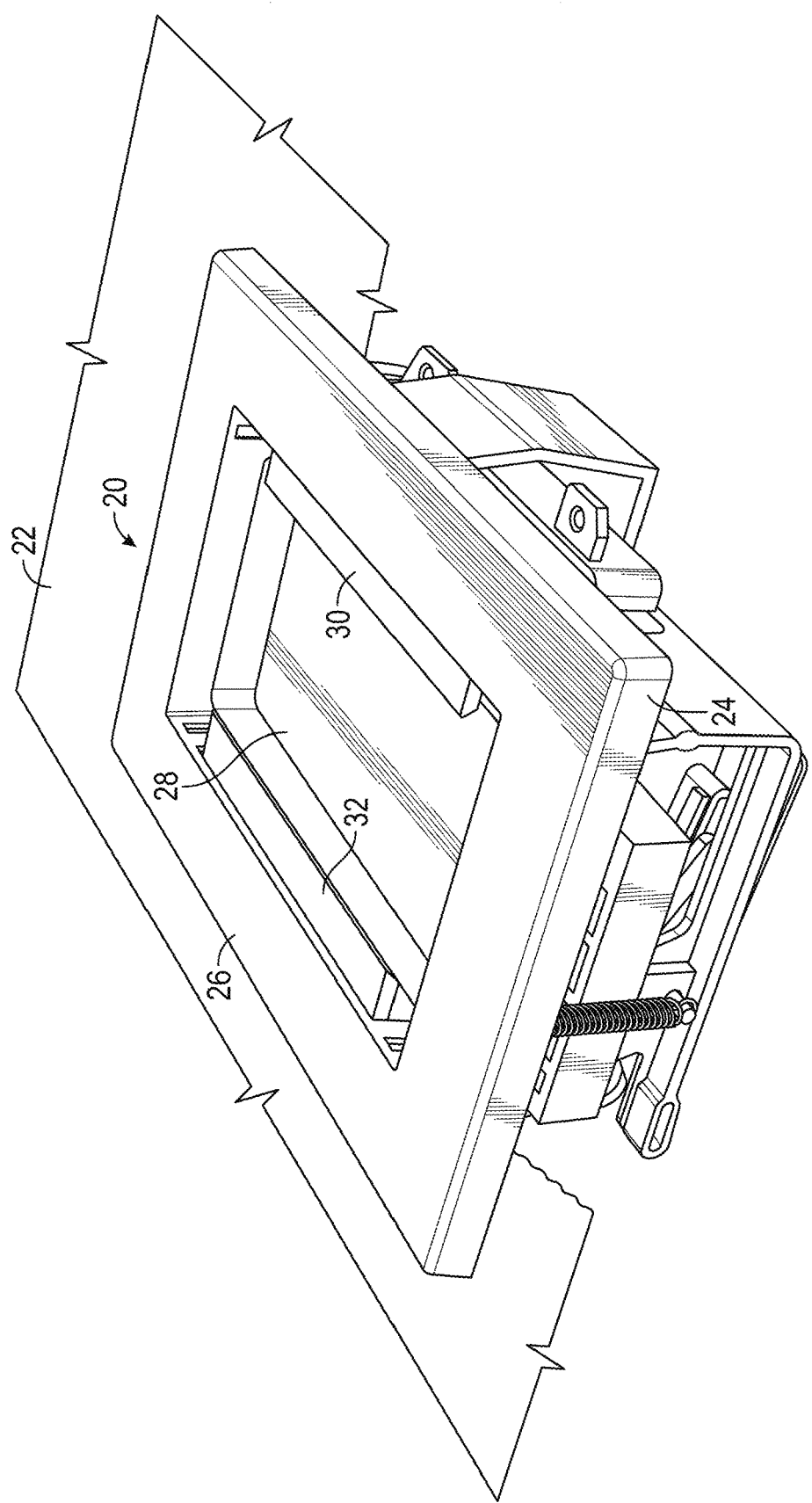
FIG. 1 is a cutaway, perspective view illustrating a non-limiting embodiment of a mobile-device retaining assembly made in accordance with the teachings of the present disclosure mounted in an opening of an interior surface of a passenger compartment of a vehicle.

The following detailed description is merely exemplary in nature and is not intended to limit application and uses. Furthermore, there is no intention to be bound by any expressed or implied theory presented in the preceding technical field, background, brief summary or the following detailed description.

An improved mobile-device retaining assembly for use with a vehicle is disclosed herein. In a non-limiting embodiment, the mobile-device retaining assembly of the present disclosure is arranged to support a mobile device in an orientation that is generally aligned (e.g., substantially parallel) with the surface of the vehicle interior in which the mobile-device retaining assembly is mounted. In some embodiments, when the mobile device is secured within the mobile-device retaining assembly, the display screen of the mobile device is substantially flush with the interior surface of the vehicle in which the mobile-device retaining assembly is mounted. By supporting the mobile device in this orientation, a user is able to view the display screen of the mobile device with only a glance. Furthermore, by configuring the mobile-device retaining assembly to support the mobile device parallel to the interior surface, the mobile-device retaining assembly intrudes only minimally beneath the class A surface.

The mobile-device retaining assembly includes a housing having an upper surface. When the mobile-device retaining assembly is mounted in the vehicle surface, the upper-surface will be generally aligned with (e.g., parallel to) the interior surface of the vehicle. Within the upper surface of the housing is a bed that is configured to receive and support the mobile device. The bed is configured to move with respect to the housing between a receiving position (where a mobile device may be placed on the bed) and a retaining position (where the mobile device may be secured on the bed). The motion of the bed as it moves between the receiving position and the retaining position is generally orthogonal to the upper surface of the frame. This allows the bed to maintain the mobile device in an orientation that permits a user to continuously view the display screen on the mobile device as the bed moves between the receiving position to the retaining position.

In an embodiment, the mobile-device retaining assembly includes an armature that is engaged with the bed such that movement of the bed will trigger movement of the armature. The armature is configured to exhibit a lost-motion type of movement that is dependent upon the movement of the bed. In other words, the armature is configured to remain stationary in a disengaged position with respect to the frame as the bed travels along a first portion of the path between the receiving position and the retaining position. Then, as the bed traverses a second portion of the path between the receiving position and the retaining position, the armature will move between the disengaged position and an engagement position. This delayed motion of the armature provides an opportunity for the bed to move the mobile device into a position that permits the armature to engage the mobile device. When the bed reaches the retaining position, the armature will reach the engagement position where it will engage and secure the mobile device.

In some embodiments, the armature may be configured to compress the sides of the mobile device in an interference fit to hold the mobile device in place. In other embodiments, the armature may be configured to cover and engage a portion of the upper surface of the mobile device to restrain the mobile device in place. In still other embodiments, any other suitable means of engagement to secure the mobile-device in place may be employed.

In some embodiments, the mobile-device retaining assembly may include a pair of armatures, both of which exhibit the lost-motion movement described above. In such embodiments, the pair of armatures are arranged to move in a reciprocating fashion towards and away from one another and will cooperate to secure the mobile device between them.

In some embodiments, the mobile-device retaining assembly may include an inductive battery charger disposed within the housing that is configured to electrically charge the mobile device. This provides the added advantage of charging the mobile device while it is secured and permits the user to use and access the phone without concern of depleting the battery. In some embodiments, the inductive battery charger is configured to electrically charge the mobile device only when the bed is disposed in the retaining position. This provides the added advantage of automatically charging the phone based on its position and avoids the need for the user to take a separate action to initiate charging. In some embodiments, the battery charger is mounted to an underside of the bed. This provides the added advantage of ensuring that an appropriate distance between the mobile device and the inductive charger is maintained throughout a charging cycle.

In some embodiments, the mobile-device retaining assembly includes a first cam path follower that is associated with the bed and/or that moves in a manner that corresponds to movement of the bed. The mobile-device retaining assembly also includes a first linkage having a first linkage first end and a first linkage second end, the first linkage engaged with the first cam follower at the first linkage first end. The mobile-device retaining assembly may also include a first pin engaged with the first linkage second end. In such embodiments, the first armature has a first dwell path, a first cam path, and a mobile-device engagement feature. The first dwell path is engaged with the first pin. The first cam path is configured to receive the first cam path follower. The first cam path follower is disposed external of the first cam path when the bed is in the receiving position. The first cam path follower is disposed within the first cam path when the bed is moved towards the retaining position. The first cam path has first dwell portion and a first camming portion. The first cam follower passes through the first dwell portion and the first pin passes through the first dwell path when the bed moves through a first stage of a bed path between the receiving position and the retaining position. The first armature remains stationary with respect to the bed as the bed moves through the first stage of the bed path. The first cam follower reaches the first camming portion and the first pin reaches an end of the first dwell path when the bed reaches a second stage of the bed path. The first cam follower engages the first camming portion and the first pin pushes against the end of the first dwell path as the bed moves through the second stage of the bed path. The first cam follower and the first pin cooperate to move the first armature towards a first engagement position as the bed moves through the second stage of the bed path. This embodiment provides the added advantage of ensuring reliable engagement between robust components for dependable actuation of the mobile-device retaining assembly over the lifetime of the mobile-device retaining assembly.

In some embodiments, a second armature is engaged with the bed and is further configured to engage the mobile device. The second armature is configured to remain stationary with respect to the bed as the bed moves through the first stage of movement between the receiving position and the retaining position. The second armature is configured to move with respect to the bed between a second disengaged position and a second engagement position when the bed moves through the second stage of movement between the receiving position and the retaining position. The second armature is configured to cooperate with the first armature to engage the mobile-device in the retained state when the second armature is in the second engagement position. This embodiment provides the added advantage of two armatures cooperating to secure the mobile device rather than just one. The two armatures cooperate to robustly secure the mobile device to the mobile-device retaining assembly.

In some embodiments, the bed is configured to support the mobile-device in an orientation that is substantially parallel to the internal surface of the vehicle. This provides the added advantage of minimizing the intrusion below the class A surface into the class B surface. In some embodiments, the bed is configured to maintain the mobile-device in the orientation that is substantially parallel to the internal surface of the vehicle as the bed moves between the receiving position and the retaining position. This embodiment provides the added advantage of permitting the user to maintain constant, uninterrupted eye contact with the mobile device as the bed moves along the bed path between the receiving position and the retaining position.

In some embodiments, the armature is configured to engage the mobile-device in a manner that does not obstruct access to a display screen of the mobile device. This embodiment provides the added advantage of ensuring that the user is provided with unobstructed access to the display screen of the mobile device. Because the display screen is often a touch screen, this embodiment ensures that the user will be able to interact with the mobile device without impediment.

In another embodiment, the armature includes a flexure region. This embodiment provides the added advantage of securing the mobile device with a compressive force that will permit the mobile-device retaining assembly to resist the forces acting on the mobile device due to vehicle motion. In some embodiments, the flexure region comprises a flexible material. This provides the added advantage of providing the armature with a substantially continuous and undisrupted outer mold line that does not require any special or unique packaging accommodations and that may simplify fabrication. In some embodiments, the flexure region extends along the entire length of the armature. This embodiment provides the added advantage of maximizing the ability of the armature to exert a compressive force on the mobile device.

In some embodiments, the mobile-device retaining assembly includes a biasing member that urges the bed towards the receiving position. This embodiment provides the added advantage of simplifying the mechanism that returns the bed to the receiving position and obviates the need for a motorized mechanism to move the bed back to the receiving position. In some embodiments, the biasing member comprises a spring. This embodiment provides the added advantage of utilizing a simple mechanical part that has a relatively low cost.

A greater understanding of the mobile-device retaining assembly assembly described above may be obtained through a review of the illustrations accompanying this application together with a review of the detailed description that follows.

With respect to FIG. 1, a cutaway perspective view is presented illustrating a non-limiting embodiment of a mobile-device retaining assembly 20 made in accordance with the teachings of the present disclosure. Mobile-device retaining assembly 20 is mounted in an interior surface 22 of an interior portion of a vehicle. Interior surface 22 may be located in any suitable portion of a vehicle interior including, but not limited to, a passenger compartment, a vehicle operator compartment, a luggage compartment, a storage compartment, and the like. In some embodiments, interior surface 22 may be selected based on its proximity to a vehicle occupant.

Although FIG. 1 depicts interior surface 22 as having a horizontal orientation, it should be understood that mobile-device retaining assembly 20 may be mounted to any interior surface of a vehicle including a surface that is inclined at any desirable angle. In some embodiments, mobile-device retaining assembly 20 may be mounted in an inverted orientation in a vehicle headliner or other ceiling surface without departing from the teachings of the present disclosure.

As illustrated in FIG. 1, mobile-device retaining assembly 20 includes a housing 24 having an upper surface 26. Upper surface 26 has a generally flat configuration. Interior surface 22 also has a generally flat configuration. In the illustrated embodiment, upper surface 26 is substantially parallel with interior surface 22. This arrangement facilitates a relatively low profile for mobile-device retaining assembly 20 as compared with retaining devices that support a mobile device in an upright orientation. In embodiments where interior surface 22 has a curved surface, upper surface 26 may be arranged to be generally tangential with a proximate portion of interior surface 22. In other embodiments, mobile-device retaining assembly 20 may be mounted in an orientation such that upper surface 26 is disposed at an incline with respect to interior surface 22. Such a mounting arrangement may be employed where it is desirable to support the mobile device in a position facing the user of the mobile device to provide him or her with greater visibility and access to the mobile device while it is being retained.

In FIG. 1, a portion of interior surface 22 has been cut away to reveal the portion of mobile-device retaining assembly 20 that is disposed beneath the class A surface. Because mobile-device retaining assembly 20 is configured to support the mobile device in an orientation that is generally parallel to interior surface 22, the mobile device need only travel a relatively short distance when it is pressed down into mobile-device retaining assembly 20. If mobile-device retaining assembly 20 were configured to support the mobile device in an upright orientation, then substantially more distance would be traveled when pressing the mobile device into the secured position. Because only a relatively shallow depression is required here, the portion of mobile-device retaining assembly 20 that lies beneath interior surface 22 is relatively thin and therefore only minimally intrudes into the class B surface.

In FIG. 1, mobile-device retaining assembly 20 is illustrated free of any mobile device in pre-actuation state. A bed 28 is situated within an opening in upper surface 26 and is positioned to receive a mobile device. An engagement portion 30 of an armature 36 (see FIG. 2) and an engagement portion 32 of an armature 38 (see FIG. 2) are positioned on opposite sides of bed 28 and will move inwardly to engage and secure a mobile device as bed 28 is depressed. In some embodiments, from the interior of the vehicle passenger compartment, only upper surface 26, bed 28, and engagement portions 30 and 32 are visible to vehicle occupants. These surfaces may be decorated in any desired and/or aesthetically pleasing fashion to conform and/or complement the class A surface in which mobile-device retaining assembly 20 is mounted.

Figure 2:
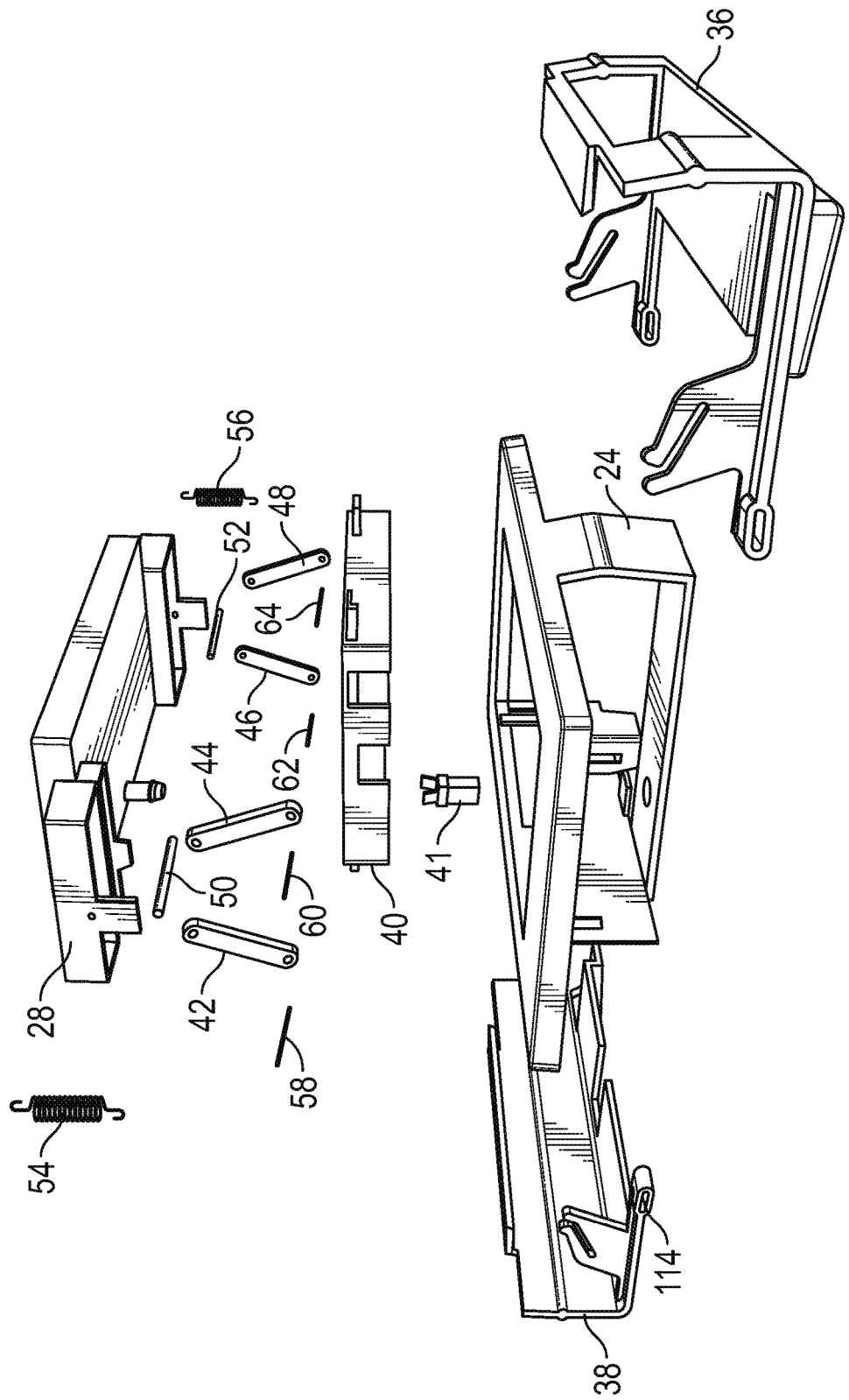
FIG. 2 is an exploded view of the mobile-device retaining assembly of the present disclosure.

FIG. 2 is an exploded view showing the components of mobile-device retaining assembly 20. It should be understood that this view is of an exemplary embodiment. In other embodiments, a greater or smaller number of components may be included in mobile-device retaining assembly 20 without departing from the teachings of the present disclosure.

In the illustrated embodiment, mobile-device retaining assembly 20 includes bed 28, a center pin 50, a center pin 52, a linkage 42, a linkage 44, a linkage 46, a linkage 48, a pin 58, a pin 60, a pin 62, a pin 64, a spring 54, a spring 56, an inductive charger 40, a push-push damper/latch 41, housing 24, armature 36, and armature 38. In some embodiments, mobile-device retaining assembly 20 may exclude inductive charger 40. In such embodiments, mobile-device retaining assembly 20 would not provide a mobile device recharging service, but rather, would merely serve as a convenient storage mechanism to secure a mobile device during vehicle operations.

Figure 3:
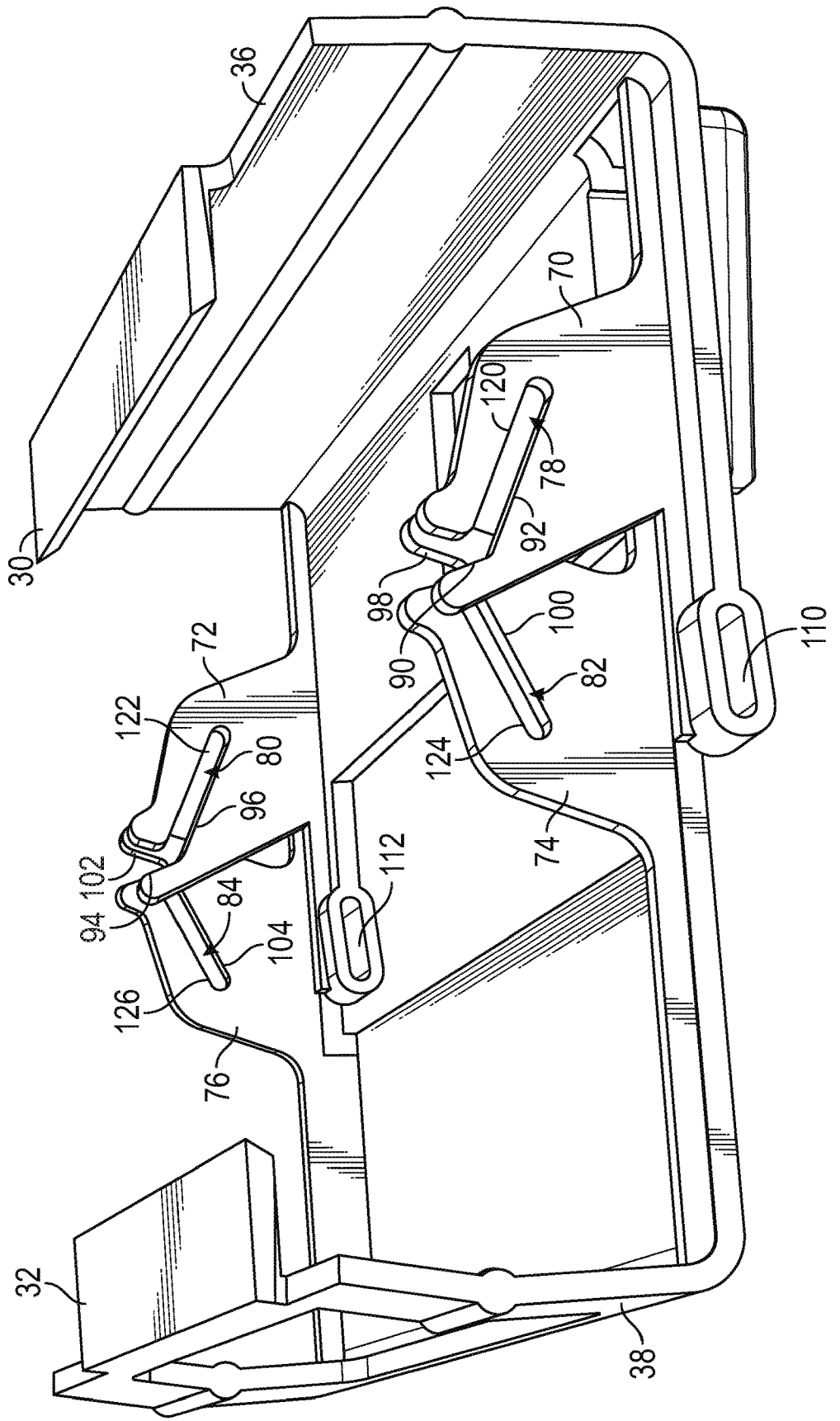
FIG. 3 is a perspective view illustrating the relationship between the armatures of the mobile-device retaining assembly of FIG. 1.

FIG. 3 is a perspective view illustrating an arrangement between armature 36 and armature 38. The illustrated arrangement is the one occupied by these components when housed within housing 24. In the illustrated embodiment, armature 36 and armature 38 are identical components arranged to face each other and situated in an interleafing fashion to permit reciprocation.

With continuing reference to FIGS. 1 and 2, engagement portion 30 and engagement portion 32 are disposed directly opposite one another when armature 36 and armature 38 are arranged as illustrated in FIG. 3. When mobile-device retaining assembly 20 is actuated by a user placing a mobile device on bed 28, pressing on the mobile device, and moving the mobile device down into housing 24, armatures 36 and 38 will move towards one another. This, in turn, will move engagement portion 30 and engagement portion 32 towards one another. As engagement portion 30 and engagement portion 32 move towards one another, each will engage the mobile device disposed between them. Engagement portions 30 and 32 are configured to engage the mobile device either by compressing against the sides of the mobile device or by engaging an upward facing surface of the mobile device, depending upon the dimensions of the mobile device. Although a pair of armatures has been illustrated as part of mobile-device retaining assembly 20, it should be understood that in other embodiments, mobile-device retaining assembly 20 need not include two armatures, but instead may include only a single armature that engages a mobile device from a single side. In still other embodiments, mobile-device retaining assembly 20 may include more than two armatures without departing from the teachings of the present disclosure.

Armature 36 further includes a flange 70 and a flange 72 and armature 38 includes a flange 74 and a flange 76. Flange 70 includes a cam path 78, flange 72 includes a cam path 80, flange 74 includes a cam path 82 and flange 76 includes a cam path 84. Each cam path includes two portions, a dwell portion and a camming portion. Cam path 78 includes dwell portion 90 and camming portion 92. Cam path 80 includes dwell portion 94 and camming portion 96. Cam path 82 includes dwell portion 98 and camming portion 100. Cam path 84 includes dwell portion 102 and camming portion 104.

In the illustrated embodiment, cam followers (center pins 50 and 52) are bed 28. In other embodiments, the cam followers may be mounted to inductive charger 40. Accordingly, the cam followers will move up and down in a manner that is coordinated with, and that is dependent upon movement of bed 28. Thus, when a user places a mobile device on bed 28 and presses down, this will cause bed 28 to move down which, in turn, will cause the cam followers to move down.

When a cam follower moves downwardly through the dwell portion of each cam path, no camming force will be exerted on the cam path and the corresponding flange and armature will remain stationary. When the cam follower moves through the camming portion of each cam path, the corresponding flange and armature will be moved in a direction dictated by the respective camming portions. When armatures 36 and 38 are arranged as illustrated in FIG. 3, dwell portion 90 aligns with dwell portion 98 and dwell portion 94 aligns with dwell portion 102. Thus, a single cam follower (center pin 50) may enter dwell portions 90 and 98 simultaneously and a single cam follower (center pin 52) may enter dwell portion 94 and 102 simultaneously. As the cam followers move downward through the respective dwell portions of cam paths 78, 80, 82, and 84, armatures 36 and 38 will remain stationary.

When the cam followers reach the camming portions of their respective cam paths, continued movement of the cam followers in a downward direction will cause the cam followers to engage the camming portions of their respective cam pathways and exert a camming force on the respective flanges and armatures. For example, when center pin 50 enters dwell portion 90 and dwell portion 98 (see FIG. 3) and moves in a downward direction (from the perspective of FIG. 4), no camming force is exerted on cam pathways 78 or 82 and therefore armatures 36 and 38 are not urged towards one another. When center pin 50 reaches camming portion 92 and camming portion 100, center pin 50 will engage camming portion 92 and camming portion 100 and will, from there on, exert a camming force on flanges 70 and 74. This, in turn, will urge armatures 36 and 38 towards one another.

Figure 4:
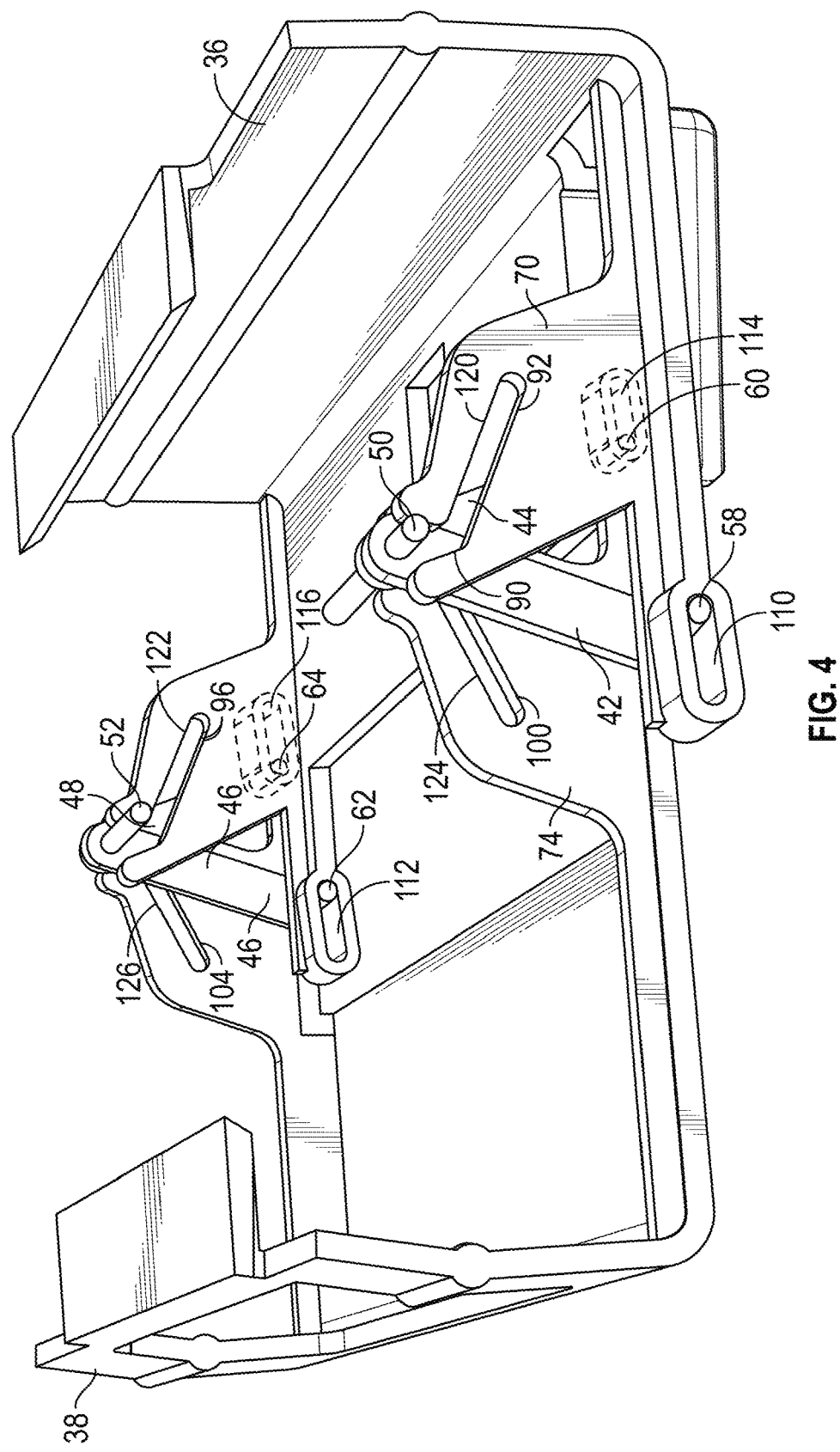
FIG. 4 is a perspective view illustrating the armatures of FIG. 3 with linkages and pins.

Armature 36 and armature 38 each further include a pair of dwell paths. Armature 36 includes a dwell path 110 and a dwell path 112. Armature 38 includes a dwell path 114 (see FIG. 5) and a dwell path 116 (see FIG. 5). Each dwell path is configured to receive a corresponding pin. As illustrated in FIG. 4, and with continuing reference to FIG. 2, dwell path 110 receives pin 58, dwell path 112 receives pin 62, dwell path 114 receives pin 60, and dwell path 116 receives pin 64. Each pin is configured to fit within each respective dwell path and is further configured to slide within each respective dwell path without obstruction between opposite ends of the dwell path.

Movement of pins 58 and 60 are synchronized with movement of center pin 50 by linkages 42 and 44. Similarly, movement of pins 62 and 64 are synchronized with movement of center pin 52 by linkages 46 and 48, respectively. By virtue of these linkages, when center pin 50 moves downwardly or upwardly, pins 58 and 60 are moved in an outboard direction or an inboard direction, respectively. Similarly, when center pin 52 moves downwardly or upwardly, pins 62 and 64 are also moved in an outboard direction or an inboard direction, respectively. Because movement of center pins 50 and 52 is dependent upon movement of bed 28, and because movement of pins 58 and 60 and pins 62 and 64 is dependent upon movement of center pins 50 and 52, it follows that movement of pins 58, 60, 62, and 64 are also dependent on movement of bed 28.

As each pin slides along its respective dwell path, no substantial force is exerted by the pin on its respective dwell path. Therefore, no substantial force is exerted by each pin on its respective armature during movement of the pin through its dwell path. Accordingly, movement of the pins through the respective dwell paths will not cause the armatures to move.

Once each pin reaches an end of its dwell path, any further movement of the pin in the same direction will exert a force on the pin's respective flange. This, in turn, will urge each respective armature to move. For example, when pin 58 and pin 62 reach the left end (from the perspective of FIG. 4) of dwell paths 110 and 112, respectively, any continued movement of pins 58 and 62 to the left will urge armature 36 towards the left.

Dwell paths 110, 112, 114, and 116 are configured to cooperate with cam paths 78, 80, 82, and 84 to refrain from exerting any substantial force on armatures 36 and 38 as center pins 50 and 52 move through dwell portions 90 and 98 and dwell portions 94 and 102, respectively and as pins 58 and 60 and pins 62 and 64 move through dwell paths 110 and 114 and dwell paths 112 and 116, respectively. This permits armatures 36 and 38 to remain stationary as bed 28 travels through the first stage of its travel path. In this manner, the movement of center pins 50 and 52 through dwell portions 90 and 98 and through dwell portions 94 and 102, respectively and the movement of pins 58 and 60 and the movement of pins 62 and 64 through dwell paths 110 and 114 and through dwell paths 112 and 116, respectively correspond with, and define, the first stage of travel of bed 28 along its travel path between its receiving position and its retaining position.

Dwell paths 110, 112, 114, and 116 are further configured to cooperate with camming portions 92, 96, 100, and 104 to cause armatures 36 and 38 to move either towards or away from one another (depending upon the direction of movement of the cam followers and the pins) as bed 28 moves through a second stage of its travel path. In this manner, the movement of center pin 50 and center pin 52 through camming portions 92 and 100 and through camming portions 96 and 104 corresponds with, and defines the second stage of travel of bed 28 along its travel path between its receiving position and its retaining position.

Dwell portions 90, 94, 98, and 102 and dwell paths 110, 112, 114, and 116 are configured such that as a cam follower reaches an end of its respective dwell portion, a corresponding pin will reach the end of its dwell path. For example, when center pin 52 reaches the end of dwell portion 90 and encounters camming portion 92, pin 58 will contemporaneously reach an end of outboard travel through dwell path 110 and encounter an end wall of dwell path 110. At that point in time, any further downward movement of center pin 50 will cause a camming force to be exerted on camming portion 92 and on camming portion 100. It will also cause an outboard urging force to be exerted on dwell path 110 and on dwell path 114 through linkages 42 and 44. The camming force and the outboard urging force will cooperate to move armature 36 toward the left (from the perspective of FIG. 4) and to move armature 38 to the right (from the perspective of FIG. 4). A similar dynamic will occur at the opposite ends of armatures 36 and 38 where center pin 52 exerts a camming force on camming portions 96 and 104 and exerts an outboard urging force on dwell paths 112 and 116.

Figure 5:
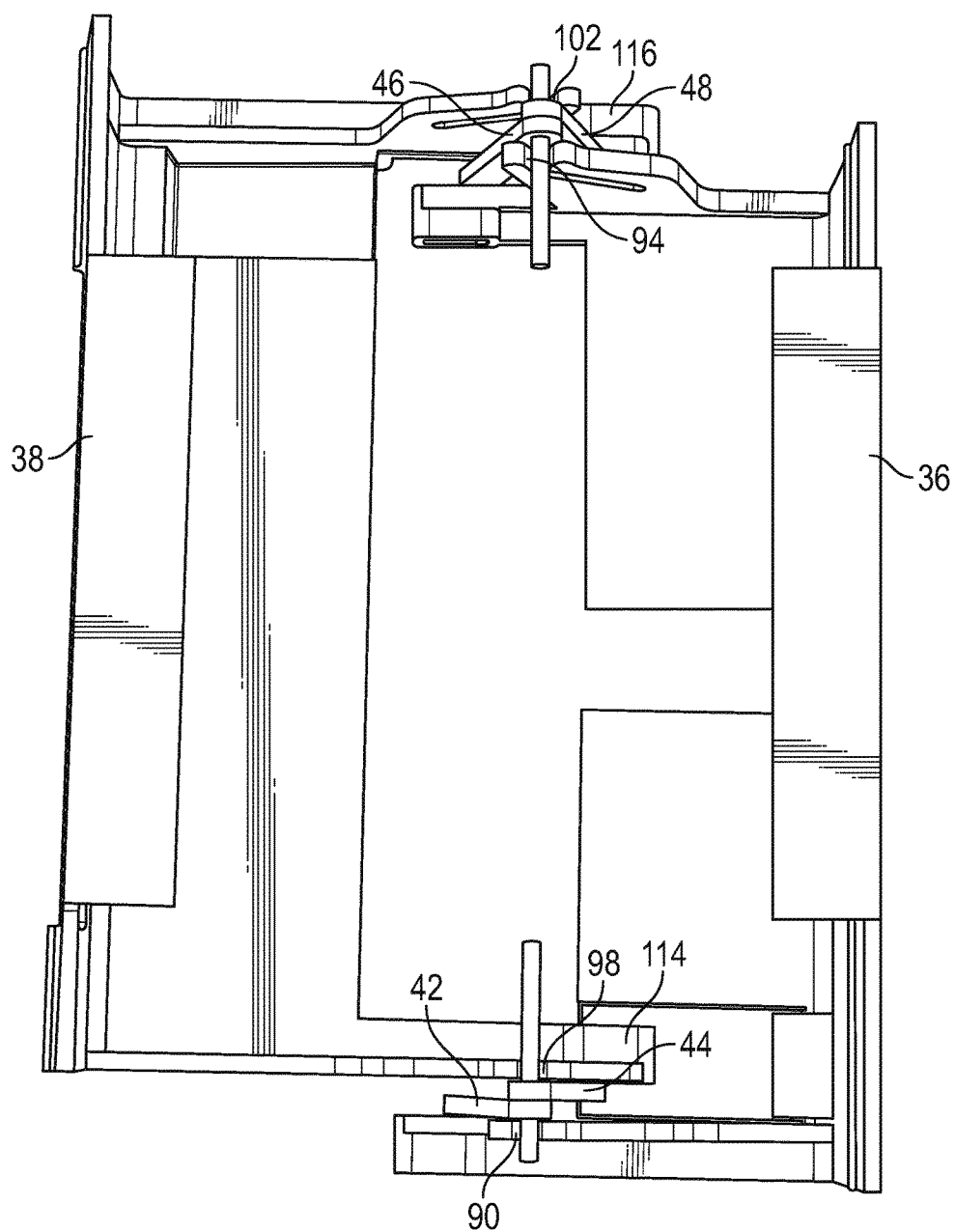
FIG. 5 is a perspective view illustrating the armatures of FIG. 4 from an overhead perspective.

FIG. 5 is a perspective view illustrating the arrangement of FIG. 4 from above. In this view, the relative positioning of linkages 42 and 44 and of linkages 46 and 48 with respect to armatures 36 and 38 can be seen. As illustrated, center pins 50 and 52 (which are the cam followers in this embodiment) extend through openings in linkages 42 and 44 and through openings in linkages 46 and 48, respectively and, are disposed directly above dwell portions 90 and 98 and above dwell portions 94 and 102, respectively. Center pins 50 and 52 are also coaxially aligned with one another in the illustrated embodiment, though it should be understood that in other embodiments, they need not be coaxially aligned with one another or aligned with one another in any way.

FIGS. 6-11 illustrate various stages of actuation of mobile-device retaining assembly 20.

Figure 6:
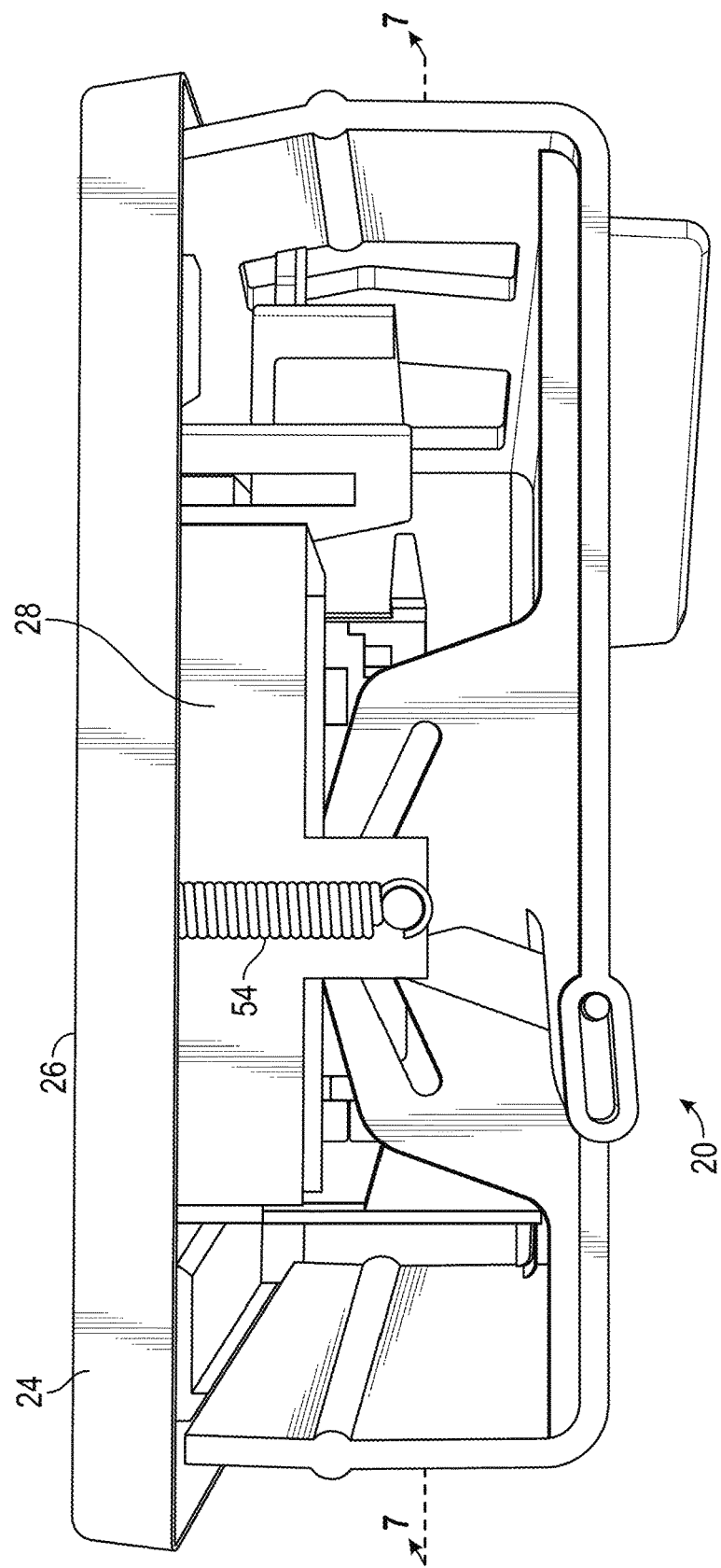
FIG. 6 a side view of the mobile-device retaining member prior to actuation of the engagement function.
Figure 7:
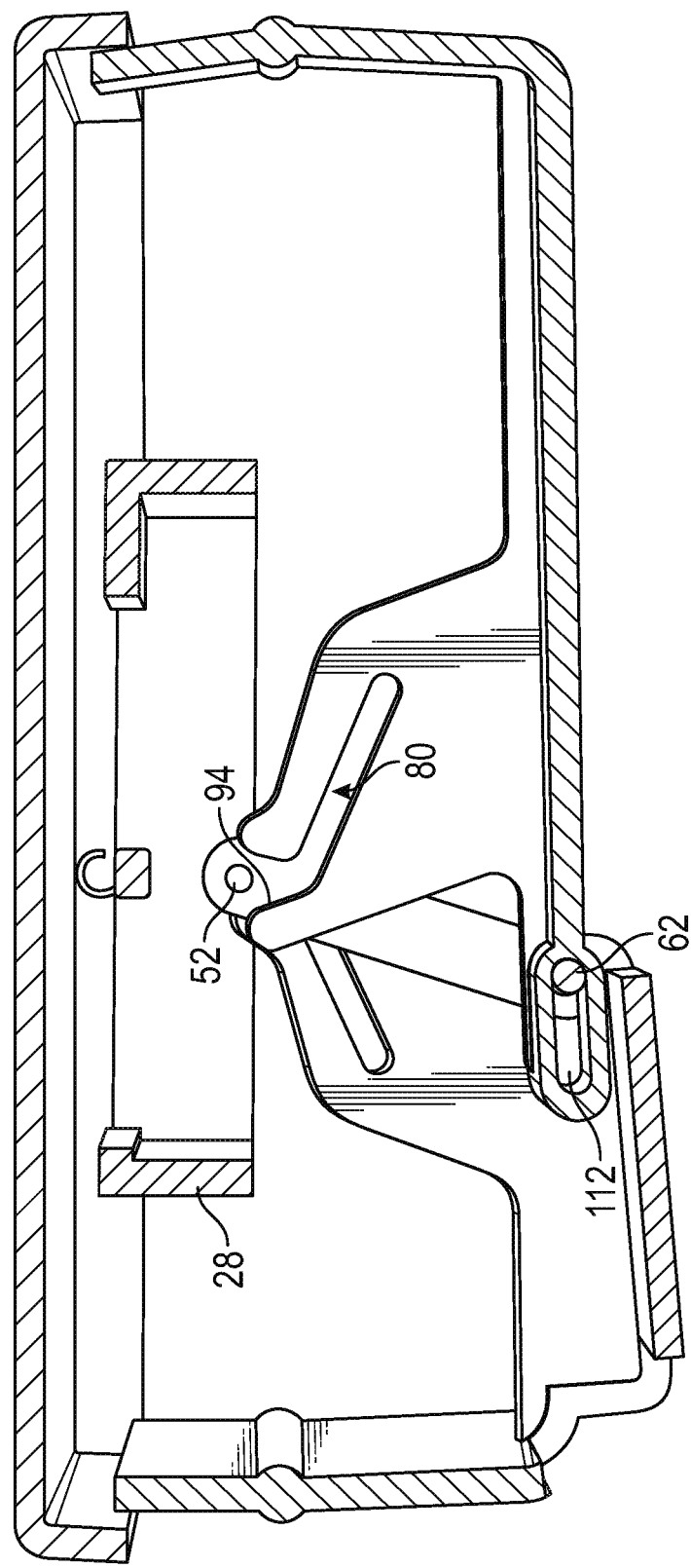
FIG. 7 is a sectional view taken along the line 7-7 of FIG. 6.

FIG. 6 is a side view illustrating mobile-device retaining assembly 20 prior to actuation and FIG. 7 is a sectional view taken along the line 7-7 of FIG. 6.

With continuing reference to FIGS. 1-5, at the actuation stage illustrated in FIGS. 6 and 7, bed 28 is disposed at an uppermost point in its travel path with respect to housing 24. When bed 28 is in the uppermost position of its travel path, bed 28 is in the receiving position. In this position (best be seen in FIG. 1), bed 28 is most accessible to a user.

Inductive charger 40 is assembled to bed 28 and will travel up and down together with bed 28 along its travel path (for ease of illustration, inductive charger 40 has been omitted from FIGS. 6-11). Spring 54 and spring 56 (see FIG. 2) connect bed 28 to housing 24 and urge bed 28 towards upper surface 26. Accordingly, springs 54 and 56 oppose the downward movement of bed 28 and facilitate the return of bed 28 to the receiving position when the user is ready to retrieve his or her phone.

With bed 28 in the receiving position, a user need only lay his or her mobile device flat on bed 28 and push in a downward direction (from the perspective of FIG. 7) on the mobile device to initiate the cycle that will secure the mobile device. FIG. 7 illustrates the relationship between center pin 52 and cam path 80. Prior to actuation, center pin 52 is positioned above dwell portion 94. Center pin 52 is also positioned above dwell portion 102 (see FIG. 3), however the view of this is obstructed in FIG. 7 by linkage 46. Also visible in FIG. 7 is the position of pin 62 in dwell path 112 and linkage 46, which links center pin 52 to pin 62. From this view, it is evident how downward motion of center pin 52 will give rise to outboard motion of pin 62.

Figure 8:
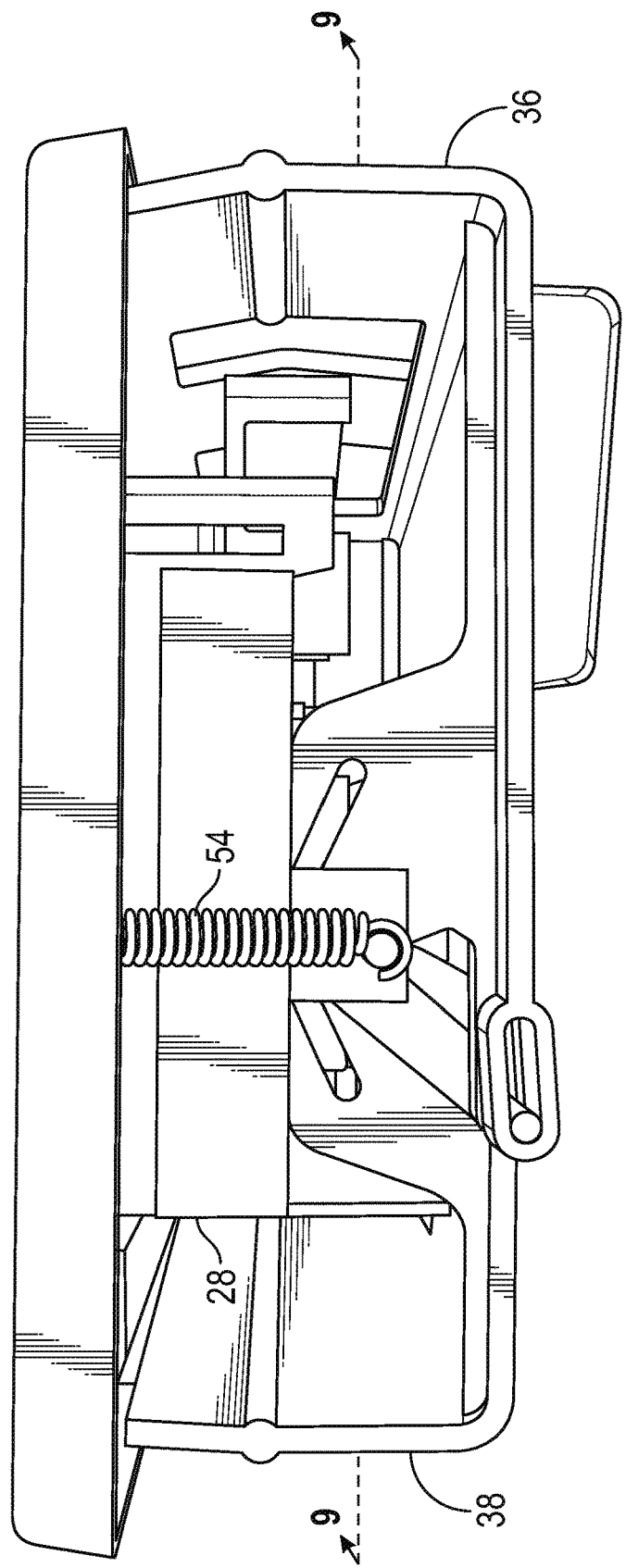
FIG. 8 is a side view of the mobile-device retaining member of FIG. 3 during an initial stage of actuation of the engagement feature.
Figure 9:
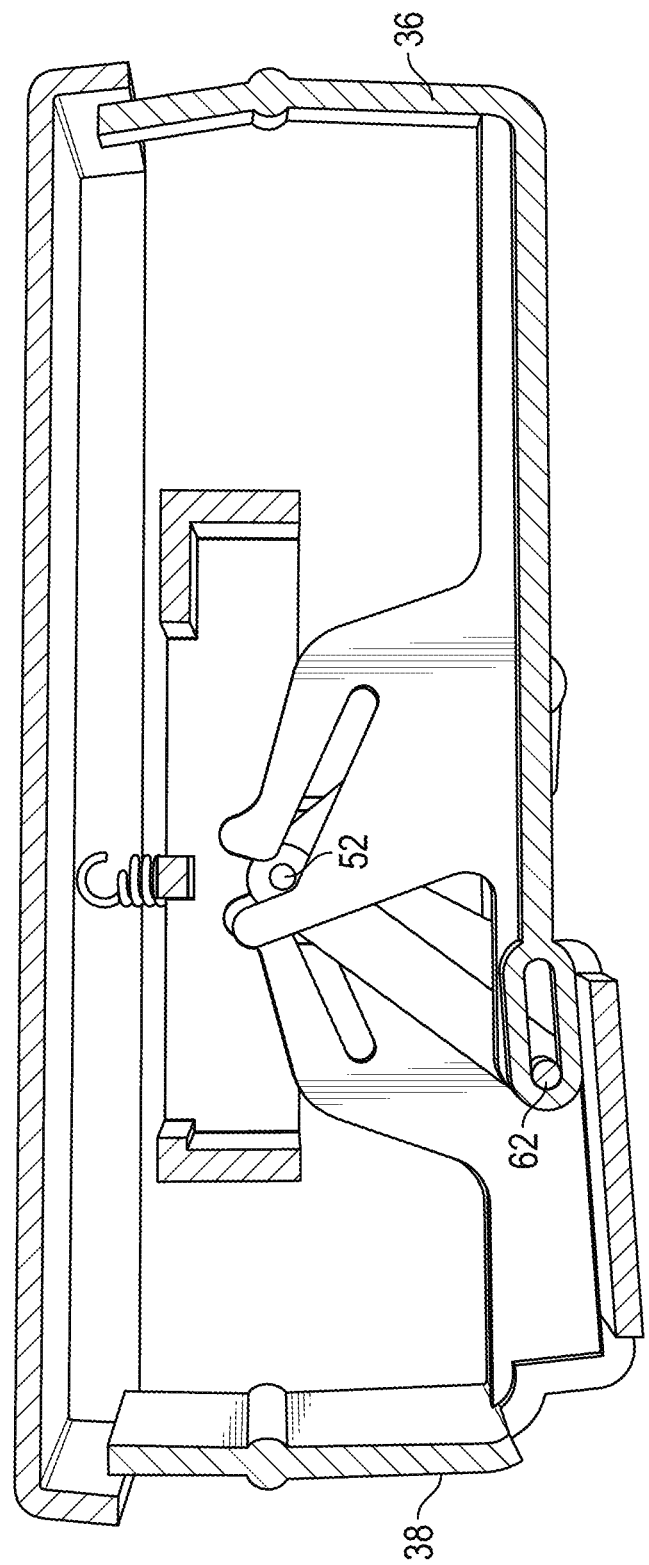
FIG. 9 is a sectional view taken along the line 9-9 of FIG. 8.

FIG. 8 is a side view illustrating mobile-device retaining assembly 20 after an initial stage of actuation has occurred and FIG. 9 is a sectional view taken along the line 9-9 of FIG. 8.

With continuing reference to FIGS. 1-7, bed 28 has moved downwardly through the first stage along its travel path. The first stage of the bed travel path extends from the upper most position of bed 28 down to the point where center pin 50 reaches an end of dwell portions 90, 98, center pin 52 reaches an end of dwell portions 94, 102, and pins 58, 60, and pins 62, 64 reach an outermost portion of dwell paths 110, 114 and dwell paths 112, 116, respectively. Up to this point, the movement of center pins 50, 52 and the movement of pins 58, 60, 62, and 64 have been substantially unobstructed and there has been no corresponding movement of armatures 36 and 38. This first stage of the bed travel path may also be referred to as the lost motion portion of the actuation of mobile-device retaining assembly 20 because bed 28 has moved downwardly without any corresponding motion of armatures 36 and 38. This permits an appropriate amount of downward movement of the mobile device before armatures 36 and 38 close to engage the mobile device. This delayed movement of armatures 36 and 38 ensures robust engagement between engagement portions 30, 32 and the mobile device.

As illustrated in FIGS. 8 and 9, at this intermediate stage of actuation, bed 28 has moved downwardly from the position illustrated in FIGS. 6 and 7 and spring 54 has been extended and placed in tension. As illustrated in FIG. 9, center pin 52 has moved completely through dwell portion 94 and has encountered camming portion 96. Furthermore, pin 62 has moved completely through dwell path 112 and has encountered an end wall of dwell path 112.

As bed 28 continues to move in a downward direction, center pin 50 will engage camming portions 92 and 100 and center pin 52 will engage camming portions 96 and 104. As center pins 50 and 52 engage these camming surfaces, the engagement will urge armature 36 to the left (from the perspective of FIGS. 8 and 9) and will urge armature 38 to the right (from the perspective of FIG. 9). At the same time, pins 58, 60, 62, and 64 will push on the end walls of their respective dwell paths 110, 114, 112, and 116. The concerted application of the camming force exerted by center pins 50 and 52 and the pushing force exerted by pins 58, 60, 62, and 64 will drive armatures 36 and 38 towards one another.

In some embodiments, the forces exerted on armatures 36 and 38 through the action of center pins 50 and 52 engaging with camming portions 92, 96, 100, and 104 may be sufficient, alone, to drive armatures 36 and 38 towards one another. In such embodiments, linkages 42, 44, 46, and 48 and pins 58, 60, 62, and 64 may be omitted. In other embodiments, the forces exerted on armatures 36 and 38 by linkages 42, 44, 46, and 48 and pins 58, 60, 62, and 64 may be sufficient, alone, to drive armatures 36 and 38 towards one another. In such embodiments, center pins 50 and 52 and cam paths 78, 80, 82, and 84 may be omitted.

Figure 10:
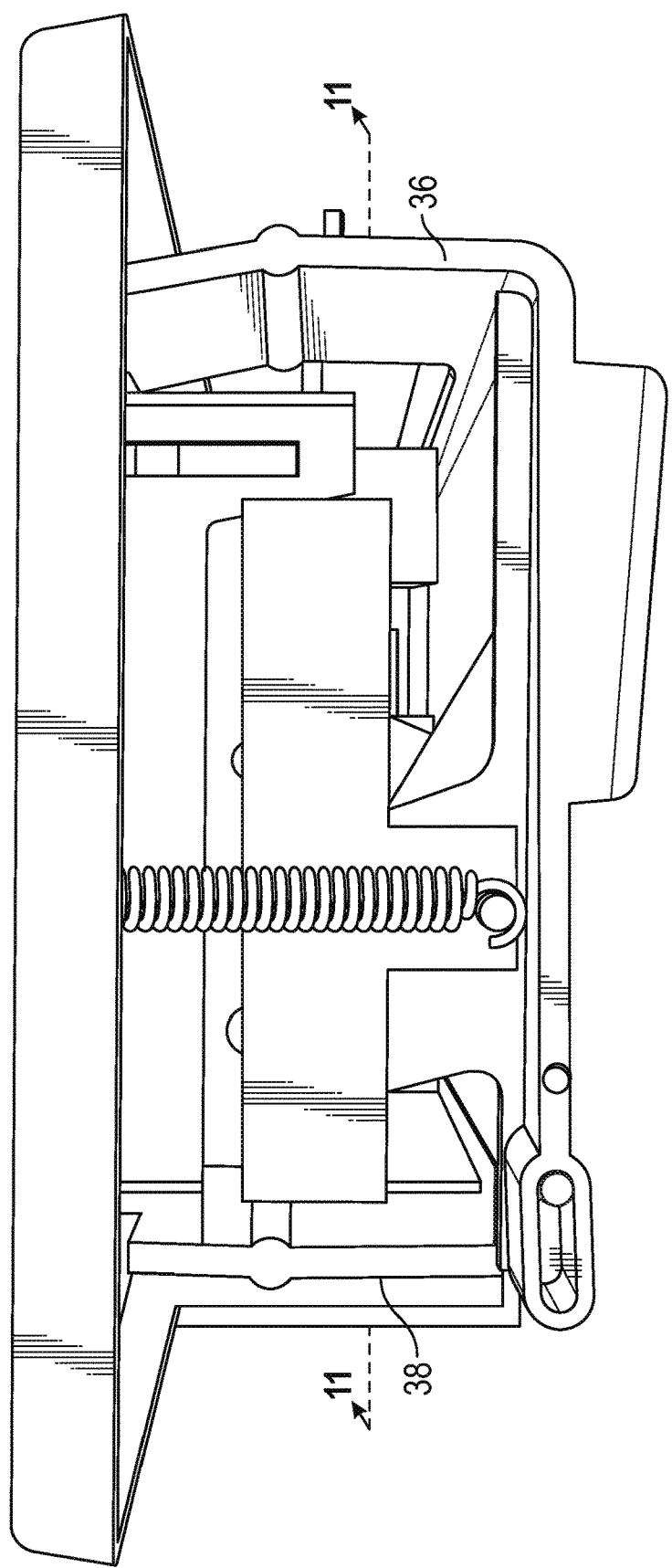
FIG. 10 is a side view of the mobile-device retaining assembly of FIG. 3 after completion of a second stage of actuation of the engagement feature.
Figure 11:
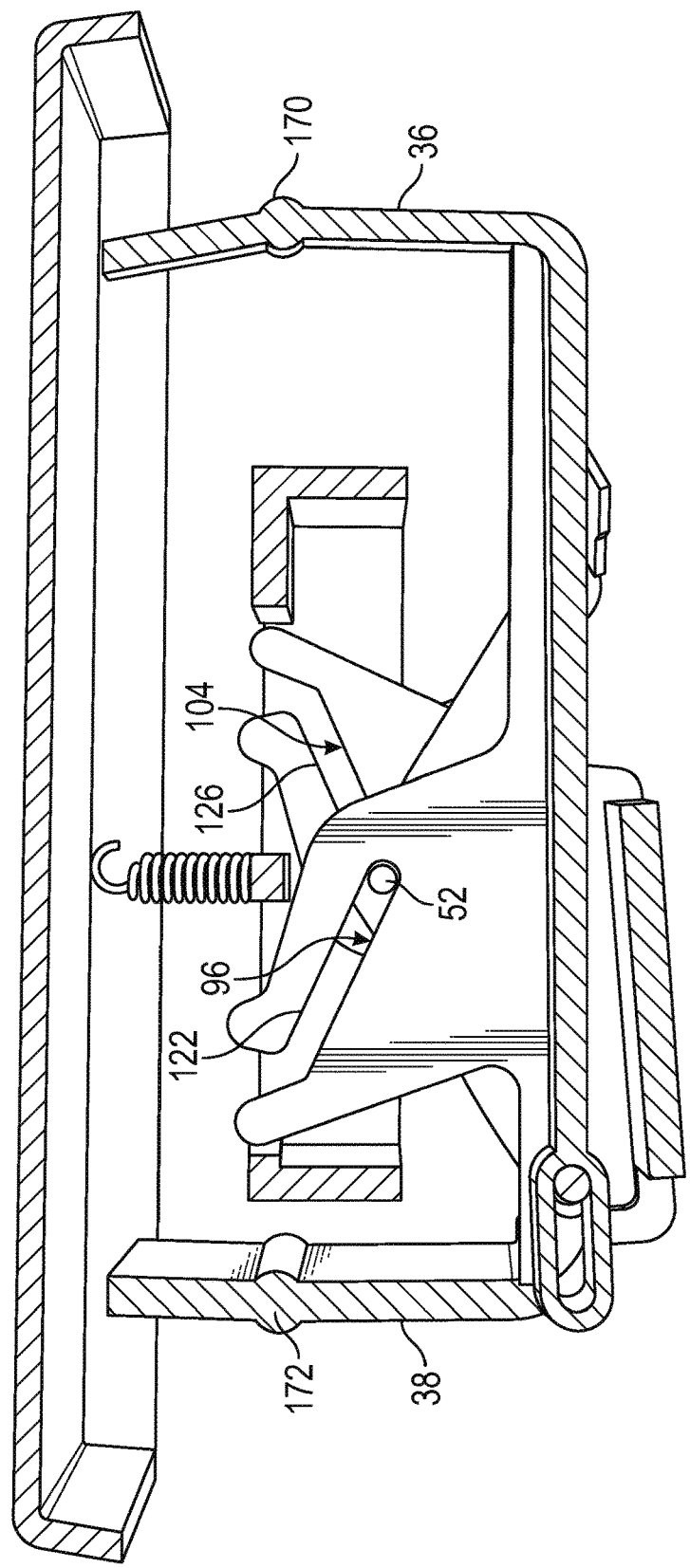
FIG. 11 is a sectional view taken along the line 11-11 of FIG. 10.

FIG. 10 is a side view illustrating mobile-device retaining assembly 20 after actuation has been completed and a mobile device has been secured by mobile-device retaining assembly 20 and FIG. 11 is a sectional view taken along the line 11-11 of FIG. 10.

In FIGS. 10 and 11, the center pins have reached the end of the camming portions of their respective cam paths. This can best be seen in FIG. 11 where center pin 52 has reached the ends of both camming portion 96 and camming portion 104. When the center pins have reached the ends of the camming portions of their respective cam paths and no further downward travel for bed 28 is possible, bed 28 has reached the end of the second stage of its travel path and is situated in its retaining position. At this point, inductive charger 40 may begin to charge the mobile device.

With continuing reference to FIG. 2, in the position illustrated in FIG. 11, push-push damper/latch 41 is engaged/latched and will hold bed 28 in the retaining position, and will inhibit bed 28 from returning to the receiving position until a second downward push unlatches push-push damper/latch 41. At that time, push-push damper/latch 41 will unlatch and bed 28 will be permitted to return to the receiving position under the urging of springs 54 and 56. At that time, springs 54 and 56 will cause center pin 50 to engage upper surfaces 120 and 124 (see FIGS. 3 and 4) of cam paths 78 and 82 and will also cause center pin 52 to engage upper surfaces 122 and 126 (see FIGS. 3 and 4) of cam paths 80 and 84 which, in turn, will drive armature 36 towards the right (from the perspective of FIG. 10) and will drive armature 38 towards the left (from the perspective of FIG. 10) until they have returned to the position illustrated in FIG. 6.

Figure 12:
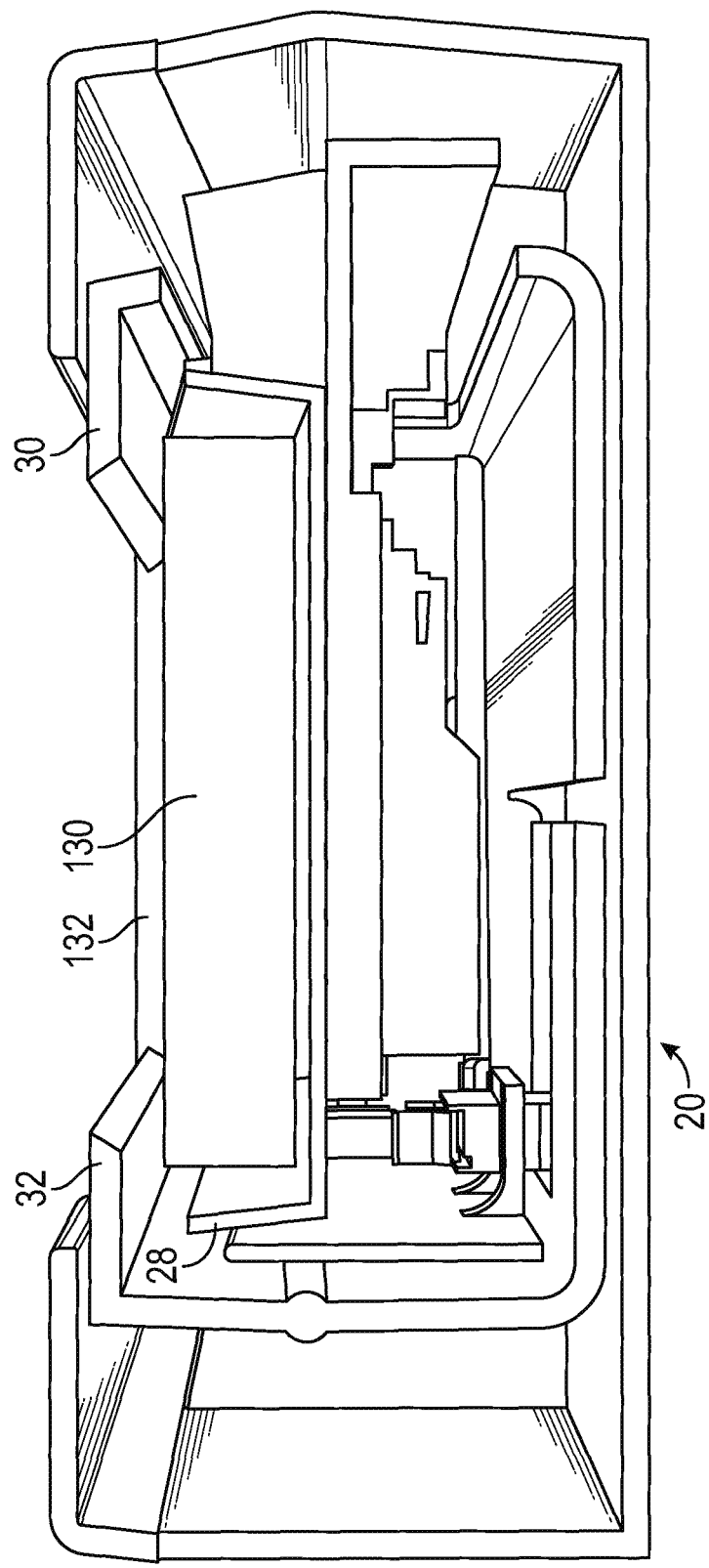
FIG. 12 is a cutaway side view of the mobile-device retaining assembly of FIG. 1 engaged with a mobile device having a first thickness.
Figure 13:
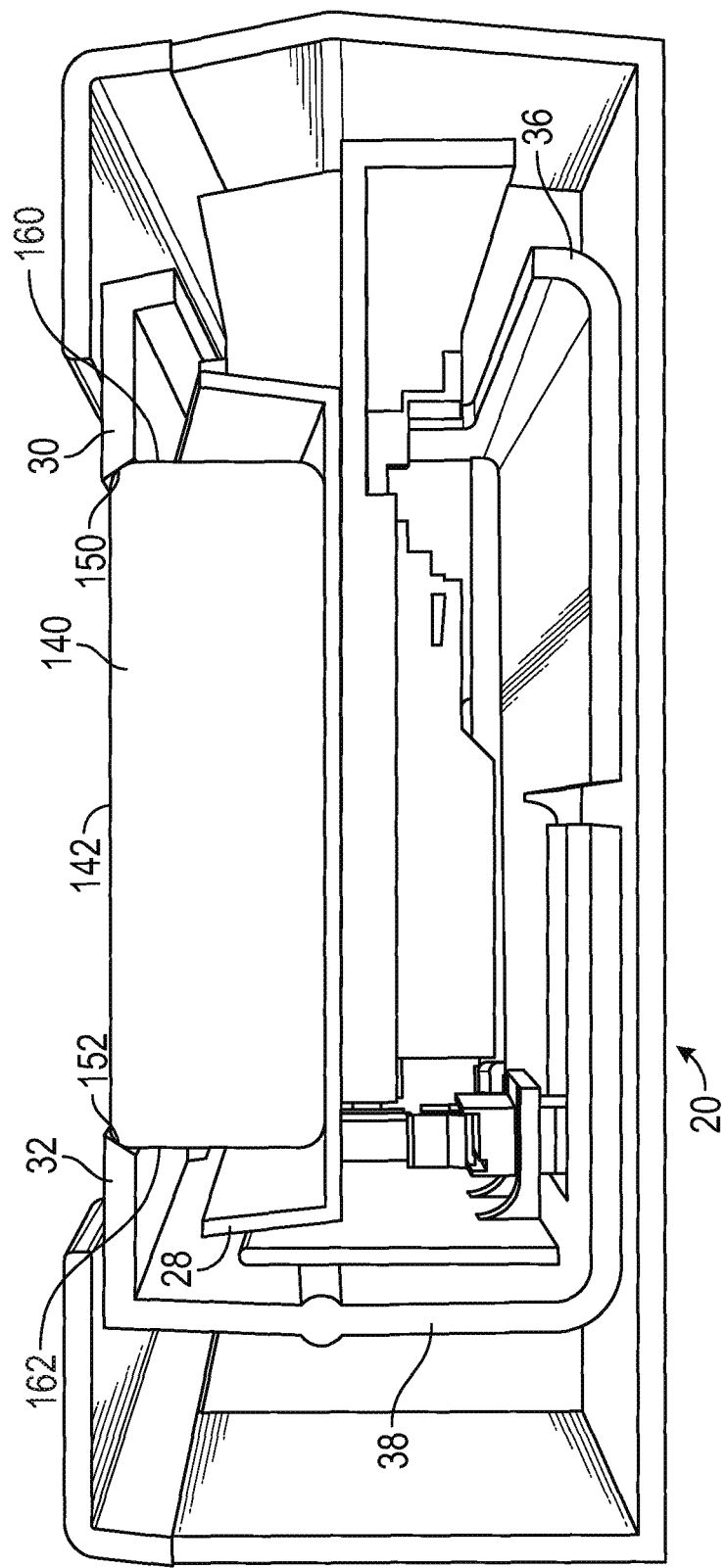
FIG. 13 is a cutaway side view of the mobile-device retaining assembly of FIG. 1 engaged with a mobile device having a second thickness.

FIGS. 12 and 13 are cutaway side views illustrating mobile-device retaining assembly 20 engaged with differently sized mobile devices. In FIG. 12, mobile-device retaining assembly 20 is engaged with a relatively thin mobile device and in FIG. 13, mobile-device retaining assembly 20 is engaged with a relatively thick mobile device (FIG. 13).

With respect to FIG. 12, a mobile device 130 is seated in bed 28 and retained in mobile-device retaining assembly 20 by engagement portions 30 and 32. As a result of the relatively thin profile of mobile device 130, engagement portion 30 and engagement portion 32 both extend above and over an upper surface 132 of mobile device 130. Configured in this manner, mobile device 130 is compressed against the respective undersides of engagement portions 30 and 32 by the urging of springs 54 and 56 (See FIG. 2). In this manner, engagement portions 30 and 32 cooperate to hold mobile device 130 in place on bed 28.

With respect to FIG. 13, a mobile device 140 is seated in bed 28 and retained in mobile-device retaining assembly 20 by engagement portions 30 and 32. As a result of the relatively thick profile of mobile device 140, engagement portions 30 and 32 are not able to extend over and above an upper surface 142 of mobile device 140. Instead, as armatures 36 and 38 move inwardly to retain mobile device 140, end surfaces 150 and 152 of engagement portions 30 and 32, respectively, engage sides 160 and 162 of mobile device 140. Because end portions 150 and 152 will encounter sides 160 and 162 before armatures 36 and 38 reach their respective engagement positions, mobile device 140 is compressed between engagement portions 30 and 32.

To facilitate this compression, armature 36 includes a flexure point 170 and armature 38 includes a flexure point 172, best seen in FIG. 11. These flexure points allow armature 36 and 38 to flex during movement between the disengaged position (illustrated in FIG. 9) and the engagement position (illustrated in FIG. 13). The existence of flexure points 170 and 172 effectively permit the upper half of armatures 36 and 38 to flex in an outboard direction as the lower half of armatures 36 and 38 continue to move towards their engagement positions. Thus, flexure points 170 and 172 effectively turn armatures 36 and 38 into springs and when the upper halves of armatures 36 and 38 flex in an outboard direction, the "springs" are placed into compression which is used to hold mobile device 140 in place.

Flexure points 170 and 172 (see FIG. 11) may be incorporated in armatures 36 and 38 in any suitable manner. In some embodiments, armatures 36 and 38 may be fabricated as be assembled from three separate components, an upper half, a lower half, and a flexure point. The flexure point may comprise any suitable mechanism or component that is effective to join the upper half to the lower half and to permit flexure between the two halves. In other embodiments, armatures 36 and 38 may be fabricated as a single component and flexure points 170 and 172 may each comprise a different material having a different modulus of elasticity that permits the upper half of each armature to flex with respect to the lower half of each armature. Other configurations are also possible without departing from the teachings of the present disclosure.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration in any way. Rather, the foregoing detailed description will provide those skilled in the art with a convenient road map for implementing the exemplary embodiment or exemplary embodiments. It should be understood that various changes can be made in the function and arrangement of elements without departing from the scope as set forth in the appended claims and the legal equivalents thereof.

What is claimed is:

1. A mobile-device retaining assembly for use with a vehicle, the mobile-device retaining assembly comprising:
    a housing configured for mounting in an opening in an internal surface of a passenger compartment of the vehicle;
    a bed associated with the housing, the bed configured to receive a mobile device and to support the mobile device in an orientation that is generally aligned with the internal surface;
    a first armature engaged with the bed and configured to engage the mobile device,
    a first cam path follower associated with the bed;
    a first linkage having a first linkage first end and a first linkage second end, the first linkage engaged with the first cam path follower at the first linkage first end; and
    a first pin engaged with the first linkage second end,
    wherein the first armature has a first dwell path, a first cam path, and a mobile-device engagement feature, the first dwell path engaged with the first pin, the first cam path configured to receive the first cam path follower, the first cam path follower disposed external of the first cam path when the bed is in the receiving position, and the first cam path follower disposed within the first cam path when the bed is moved towards the retaining position,
    wherein the first cam path has first dwell portion and a first camming portion,
    wherein the first cam path follower passes through the first dwell portion and the first pin passes through the first dwell path when the bed moves through a first stage of a bed path,
    wherein the first armature remains stationary with respect to the bed as the bed moves through the first stage of the bed path,
    wherein the first cam path follower reaches the first camming portion and the first pin reaches an end of the first dwell path when the bed reaches a second stage of the bed path,
    wherein the first cam path follower engages the first camming portion and the first pin pushes against the end of the first dwell path as the bed moves through the second stage of the bed path,
    wherein the first cam path follower and the first pin cooperate to move the first armature towards the first engagement position as the bed moves through the second stage of the bed path, and
    wherein the bed is configured to move with respect to the housing between a receiving position and a retaining position, wherein the first armature is configured to remain stationary with respect to the housing as the bed moves through a first stage of movement between the receiving position and the retaining position, wherein the first armature is configured to move with respect to the housing between a first disengaged position and a first engagement position when the bed moves through a second stage of movement between the receiving position and the retaining position, and wherein the first armature is further configured to secure the mobile device when the first armature is in the first engagement position.

2. The mobile-device retaining assembly of claim 1, further comprising an inductive battery charger disposed within the housing and configured to electrically charge the mobile device.

3. The mobile-device retaining assembly of claim 2, wherein the inductive battery charger is configured to electrically charge the mobile device when the bed is in the retaining position.

4. The mobile-device retaining assembly of claim 3, wherein the inductive battery charger is mounted to an underside of the bed.

5. The mobile-device retaining assembly of claim 1, wherein the bed is configured to support the mobile device in the orientation that is substantially parallel to the internal surface of the vehicle.

6. The mobile-device retaining assembly of claim 5, wherein the bed is configured to maintain the mobile device in the orientation that is substantially parallel to the internal surface of the vehicle as the bed moves between the receiving position and the retaining position.

7. The mobile-device retaining assembly of claim 1, wherein the first armature is configured to engage the mobile device in a manner that does not obstruct access to a display screen of the mobile device.

8. The mobile-device retaining assembly of claim 1, further comprising a second armature engaged with the bed and configured to engage the mobile device, wherein the second armature is configured to remain stationary with respect to the bed as the bed moves through the first stage of movement between the receiving position and the retaining position, wherein the second armature is configured to move with respect to the bed between a second disengaged position and a second engagement position when the bed moves through the second stage of movement between the receiving position and the retaining position, and wherein the second armature is configured to cooperate with the first armature to engage the mobile device when the second armature is in the second engagement position.

9. The mobile-device retaining assembly of claim 1, wherein the first armature includes a flexure region.

10. The mobile-device retaining assembly of claim 9, wherein the flexure region comprises a flexible material.

11. The mobile-device retaining assembly of claim 10, wherein the flexure region extends along an entire length of the first armature.

12. The mobile-device retaining assembly of claim 1, further comprising a biasing member urging the bed towards the receiving position.

13. The mobile-device retaining assembly of claim 12, wherein the biasing member comprises a spring.

* * * * *